United States Patent
Noguchi et al.

(10) Patent No.: US 7,697,205 B2
(45) Date of Patent: Apr. 13, 2010

(54) ANTI-REFLECTION FINE STRUCTURE, ANTI-REFLECTION MOLD BODY, METHOD OF PRODUCING THE ANTI-REFLECTION MOLD BODY, AND AUTOMOBILE PART

(75) Inventors: Yuji Noguchi, Yokosuka (JP); Takayuki Fukui, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 348 days.

(21) Appl. No.: 11/711,903

(22) Filed: Feb. 28, 2007

(65) Prior Publication Data

US 2007/0211346 A1 Sep. 13, 2007

(30) Foreign Application Priority Data

Mar. 1, 2006 (JP) ............................ 2006-054262
Oct. 30, 2006 (JP) ............................ 2006-293705

(51) Int. Cl.
*G02B 1/10* (2006.01)
(52) U.S. Cl. ...................... 359/580; 359/599; 359/614
(58) Field of Classification Search ................. 359/566, 359/569, 581, 599, 614, 580
See application file for complete search history.

(56) References Cited

U.S. PATENT DOCUMENTS

| | | | |
|---|---|---|---|
| 4,013,465 A | 3/1977 | Clapham et al. | |
| 6,483,635 B1 | 11/2002 | Wach | |
| 2005/0266176 A1 | 12/2005 | Ishitaka et al. | |
| 2007/0228619 A1* | 10/2007 | Kawaguchi et al. | 264/496 |

FOREIGN PATENT DOCUMENTS

| | | |
|---|---|---|
| EP | 1 424 573 A2 | 6/2004 |
| JP | 2002-267815 A | 9/2002 |
| JP | 2004-219626 A | 8/2004 |
| JP | 2005-173457 A | 6/2005 |
| WO | WO 2005/116695 A1 | 12/2005 |

OTHER PUBLICATIONS

B. Blaesi et al., "Entspiegeln Mit Mottenaugenstrukturen Spritzgiessen Funktionaler Mikrostrukturierter Oberflaechen," Kunststoffe, vol. 92, No. 5, May 2002, pp. 50-53.
D. Raguin et al., "Antireflection structured surfaces for the infrared spectral region," Applied Optics, vol. 32, No. 7, Mar. 1, 1993, pp. 1154-1167.

* cited by examiner

*Primary Examiner*—Alessandro Amari
(74) *Attorney, Agent, or Firm*—Foley & Lardner LLP

(57) ABSTRACT

An anti-reflection structure; includes: a plurality of convex parts arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter Db meeting the following expression: 100 nm<Db<380 nm, ii) an upper face formed into one of an upper circle and an upper polygon inscribed in the upper circle, a) the upper circle and b) the upper circle circumscribing about the upper polygon each having an upper diameter Du meeting the following expression: 5 nm<Du<50 nm.

13 Claims, 5 Drawing Sheets

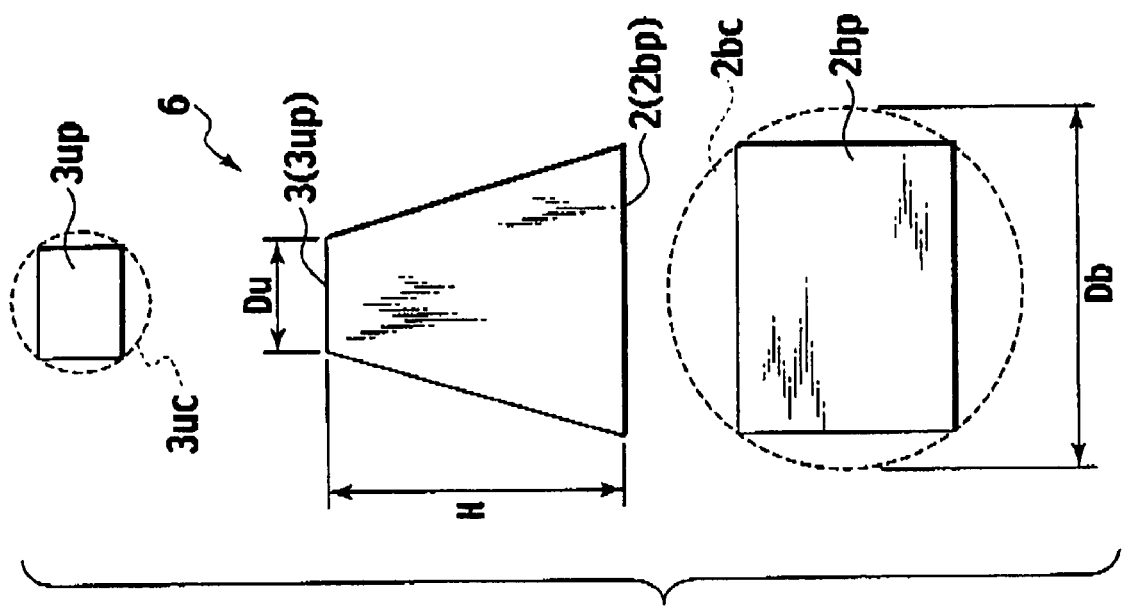
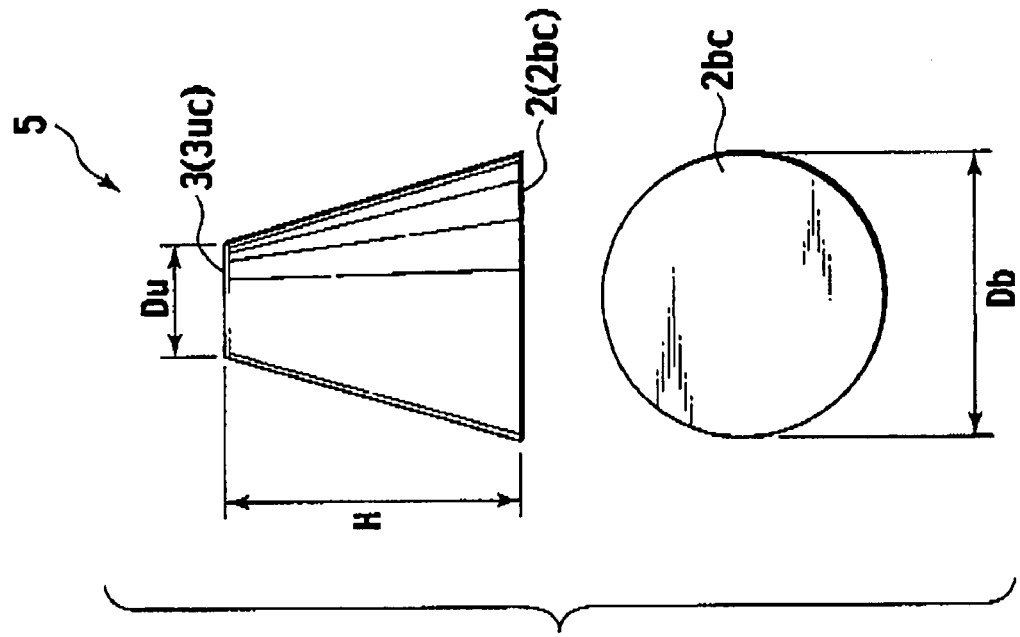
FIG. 2B
FIG. 2A

LINEAR EXPRESSION [1]
$$X = (Db/2) \times \{1 - (Z/Ha)^n\}$$

LINEAR EXPRESSION [2]
$$Z = \{Ha/(Db/2)^n\} \times X^n$$

ANTI-REFLECTION FINE STRUCTURE, ANTI-REFLECTION MOLD BODY, METHOD OF PRODUCING THE ANTI-REFLECTION MOLD BODY, AND AUTOMOBILE PART

BACKGROUND OF THE INVENTION

1. Field of the Invention

The present invention relates to an anti-reflection fine structure which is excellent in light anti-reflectivity and scratch proof. Moreover, the present invention relates to an anti-reflection mold body having the above anti-reflection fine structure, where the anti-reflection mold body as a non-reflecting panel is preferably used for such applications as i) various meters of vehicles (including automobile), ships, aircrafts and the like, ii) display devices, and the like. Furthermore, the present invention relates a method of producing the anti-reflection mold body. Still furthermore, the present invention relates to an automobile part having the above anti-reflection fine structure.

2. Description of the Related Art

An outside light or an inside illumination and the like inputted as an image into a screen of various display devices such as liquid crystal display, CRT display and the like, for more practical examples, into a screen of home-use television, as the case may be, remarkably decreases visibility of the image.

Moreover, in a driver seat of an automobile, a display part receiving various meters such as speedometer, fuel meter and the like has a front face in which a meter front cover is installed. The vehicle's outer scenery inputted as an image into the display part through a front window (windshield) or a side window, as the case may be, makes various displays less visible. In this case, a meter hood is designed on the display part, thus preventing the outside light incidence into the meter display.

A known structure for preventing reflection of the above light includes a multi-layer anti-reflection film including a plurality of thin films having different refractive indexes. Japanese Patent Application Laid-Open No. 2002-267815, however, discloses an anti-reflection structure using a fine structure for further decreasing the reflection ratio than the above multi-layer anti-reflection film.

Japanese Patent Application Laid-Open No. 2002-267815 discloses an anti-reflection structure where a myriad of fine irregularities (convexes and concaves) made of transparent raw material are formed on a surface of a transparent molded article. Forming pitches each less than or equal to a light wave length varies light refractive indexes in thickness direction.

SUMMARY OF THE INVENTION

It is an object of the present invention to provide an anti-reflection fine structure which has i) a head end configuration of fine irregularities which configuration is optimized thereby preventing breakage of the bead end of the fine irregularity without losing light anti-reflectivity, and ii) features both anti-reflectivity and scratch proof.

It is another object of the present invention to provide an anti-reflection mold body having the above anti-reflection fine structure.

It is still another object of the present invention to provide a method of producing the anti-reflection mold body.

It is furthermore another object of the present invention to provide an automobile part (such as meter front cover, window glass and the like) having the above anti-reflection fine structure.

After a keen examination or study, the present inventors have found out that the following strategy works to accomplish the above object thus completing the present invention:

Within such an extent as not to cause a harmful effect on anti-reflectivity, smoothing the most vulnerable (i.e., most likely to be scratched) head end face of the individual fine convex part of the fine irregularity structure in such a manner that the fine irregularity structure is formed substantially into a truncated cone or truncated pyramid.

According to a first aspect of the present invention, there is provided an anti-reflection structure, comprising: a plurality of convex parts arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter $D_b$ meeting the following expression: 100 nm<$D_b$<380 nm, ii) an upper face formed into one of an upper circle and an upper polygon inscribed in the upper circle, a) the upper circle and b) the upper circle circumscribing about the upper polygon each having an upper diameter $D_u$ meeting the following expression: 5 nm<$D_u$<50 nm.

According to a second aspect of the present invention, there is provided an anti-reflection mold body, on at least one of a first face and a second face thereof, comprising, an anti-reflection structure, including: a plurality of convex parts arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter $D_b$ meeting the following expression: 100 nm<$D_b$<380 nm, ii) an upper face formed into one of an upper circle and an upper polygon inscribed in the upper circle, a) the upper circle and b) the upper circle circumscribing about the upper polygon each having an upper diameter $D_u$ meeting the following expression: 5 nm<$D_u$<50 nm.

According to a third aspect of the present invention, there is provided a method of producing an anti-reflection mold body, comprising: I) preparing: A) a forming die having an anti-reflection structure including a plurality of convex parts arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter $D_b$ meeting the following expression: 100 nm<$D_b$<380 nm, ii) an upper face formed into one of an upper circle and an upper polygon inscribed in the upper circle, a) the upper circle and b) the upper circle circumscribing about the upper polygon each having an upper diameter $D_u$ meeting the following expression: 5 nm<$D_u$<50 nm, and B) a substrate for the anti-reflection mold body, II) pressing the forming die and the substrate relative to each other in such a state that at least one of the forming die and the substrate is heated; and III) forming the anti-reflection structure on at least one of a first face and a second face of the substrate.

According to a fourth aspect of the present invention, there is provided a method of producing an anti-reflection mold body, comprising: I) preparing: A) a forming die having an anti-reflection structure including: a plurality of convex parts arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter Db meeting the following expression: 100 nm<Db<380 nm, ii) an upper face formed into one of an upper circle and an upper polygon inscribed in the upper circle, a) the upper circle and b) the upper circle circumscribing about the upper polygon each having an upper diameter Du meeting the following expression: 5 nm<Du<50 nm, and B) a substrate for the anti-reflection mold body; II) irradiating an active energy to the forming die and the substrate with an active energy line setting resin intervened between the forming die and the substrate; and III) forming the anti-reflection structure on at least one of a fist face and a second face of the substrate.

According to a fifth aspect of the present invention, there is provided an automobile part, comprising: an anti-reflection Stroke including: a plurality of convex pats arranged at pitches each of which is shorter than a wave length of a visible light ray, each of the convex parts being formed into one of a substantially truncated cone and a substantially truncated pyramid, each including: i) a base face formed into one of a base circle and a base polygon inscribed in the base circle, a) the base circle and b) the base circle circumscribing about the base polygon each having a base diameter Db meeting the following expression: 100 nm<Db<380 nm, ii) an upper face formed into one of an upper circle and an upper polygon inscribed in the upper circle, a) the upper circle and b) the upper circle circumscribing about the upper polygon each having an upper diameter Du meeting the following expression: 5 nm<Du<50 nm.

The other object(s) and feature(s) of the present invention will become understood from the following description with reference to the accompanying drawings.

BRIEF DESCRIPTION OF THE DRAWINGS

FIG. 2A shows measurement positions of a fine convex part of the anti-reflection fine structure formed into a truncated cone.

FIG. 2B shows measurement positions of the fine convex part of the anti-reflection fine structure formed into a truncated pyramid.

DESCRIPTION OF THE PREFERRED EMBODIMENTS

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrate.

In addition, unless otherwise set forth hereinafter, the term "cone" denotes a circular cone, to be distinguished from the term "pyramid" while the term "truncated cone" denotes a circular truncated cone, to be distinguished from the term "truncated pyramid."

Hereinafter explained in detail under the present invention includes an anti-reflection fine structure, an anti-reflection mold body to which the anti-reflection fine structure is applied, a production method of the anti-reflection mold body, the examples (including comparative examples) of the above, and the like.

The anti-reflection fine state under the present invention includes a myriad of fine convex parts each of which formed into a truncated cone or a truncated pyramid. The fine convex parts are arranged at a pitch shorter than a wave length of visible light ray, with a base face and an upper fare of the fine convex parts formed into a circle form or a polygon each having a certain size.

Figure 1A:
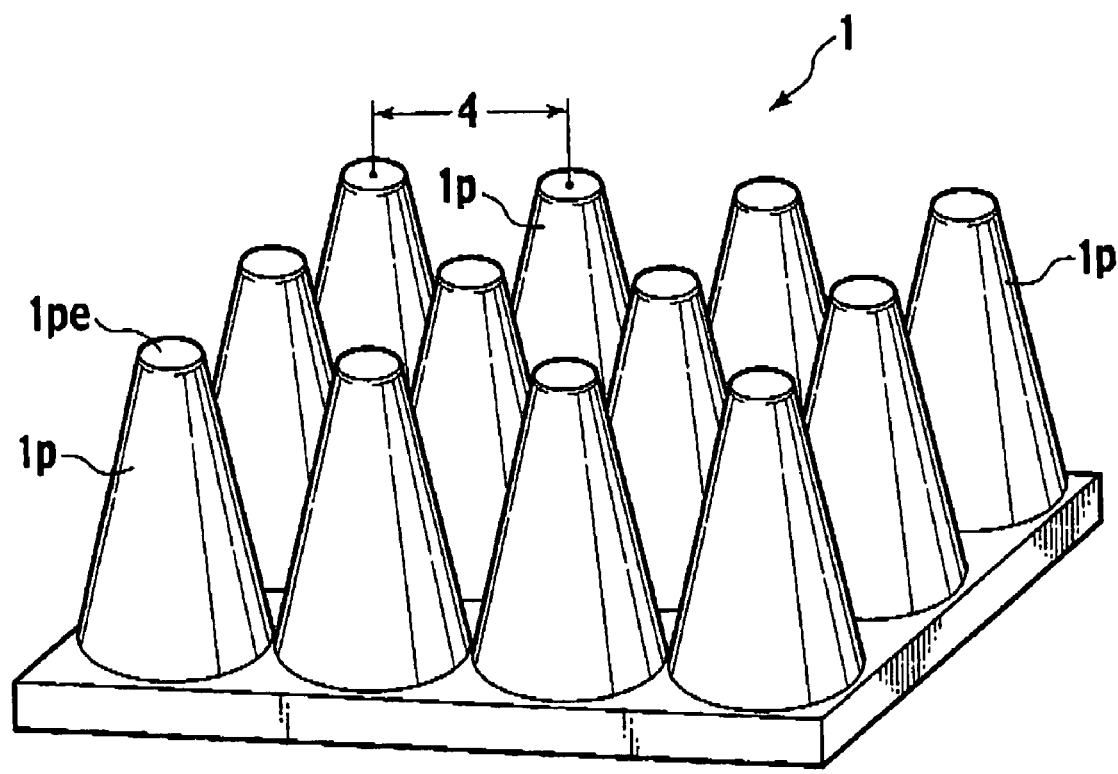
FIG. 1A is a perspective view of an anti-reflection fine structure and FIG. 1B is a perspective view of an anti-reflection mold body having the anti-reflection fine structure, under the present invention.
Figure 1B:
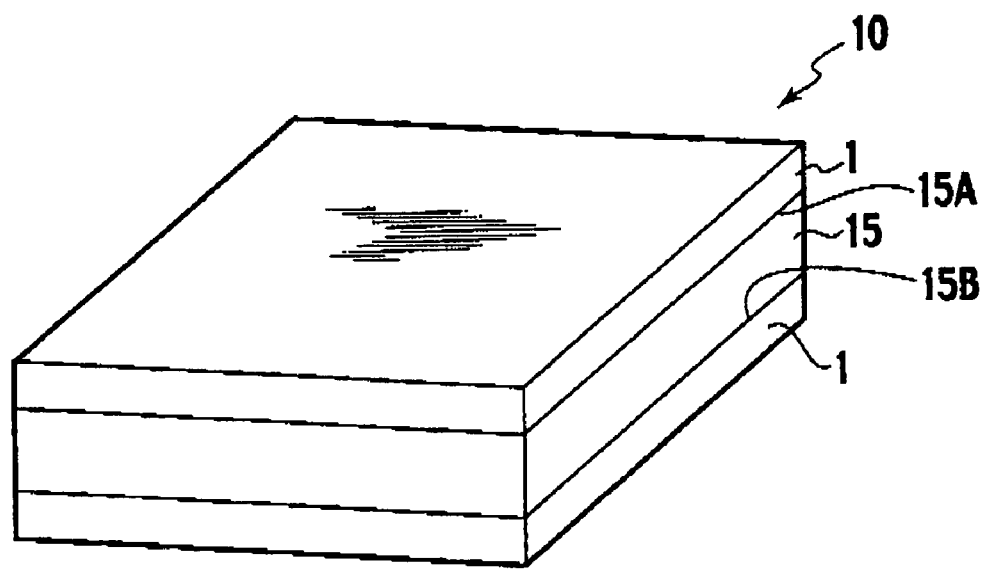

FIG. 1 is a perspective view of an anti-reflection fine structure 1 and FIG. 1B is a perspective view of an anti-reflection mold body 10 (to be set forth afterward) having the anti-reflection fine structure 1, according to an embodiment of the present invention. The anti-reflection fine structure 1 of the present invention has such a structure that a head end face $1pe$ is formed into a flat truncated cone 5 or a flat truncated pyramid 6 (FIG. 1, truncated cone), and a myriad of fine convex parts $1p$ are arranged at a pitch 4 shorter than a wave length of visible light ray.

Therefore, a light refractive index at each cross section which index is determined by an occupying ratio (the anti-reflection fine structure 1's raw material relative to air) at each step face in thickness direction of the anti-reflection fine structure 1 serially varies from an air refractive index to the raw material refractive index in the thickness direction, thereby bringing about light anti-reflectivity. Meanwhile, the head end face $1pe$ of each of the fine convex part $1p$ is flattened in after-debased numerical ranges. Therefore, the anti-reflection fine structure 1 even having friction or collision with other part materials is unlikely to be damaged or scratched, meeting both light anti-reflectivity and scratch proof, with the harmful effect on the anti-reflectivity minimized.

FIG. 2A shows a scale of the fine convex part $1p$ for the structure cone 5. A base diameter Db of a base circle $2bc$ of a base face 2 and an upper diameter Du of an upper circle $3uc$ of an upper face 3 respectively meet 100 nm<Db<380 nm and 5 nm<Du<50 nm.

Moreover, FIG. 2B shows a scale of the fine convex part $1p$ for the truncated pyramid 6, typically, a quadrangle truncated pyramid 5. Likewise, the base diameter Db of a circumscribing circle (i.e., the base circle $2bc$) about a base polygon $2bp$ of the base face 2 and the upper diameter Du of a circumscribing circle (i.e., the upper circle $3uc$) about an upper polygon $3up$ of the upper face 3, respectively, meet 100 nm<Db<380 nm and 5 nm<Du<50 nm.

That is, the base diameter Db of more than or equal to 380 nm that is the shortest wave length of the visible light may cannot make the pitch 4 between the adjacent fine convex parts $1p$ shorter than the wave length of the visible light ray, causing a light diffraction and thereby decreasing the anti-reflectivity.

Meanwhile, the lower limit of the base diameter Db is to be set forth. For securing the anti-reflectivity, the light refractive index is to be serially changed in the cross section in the thickness direction by inclining to a certain extent a side face of the fine convex part 1p. With this, the base diameter Db of less than or equal to 100 nm cannot bring about a sufficient anti-reflectivity due to an insufficient side face inclination in view of an upper limit 50 nm of the upper diameter Du (to be set forth in detail afterward) of the upper face 3.

Figure 3:
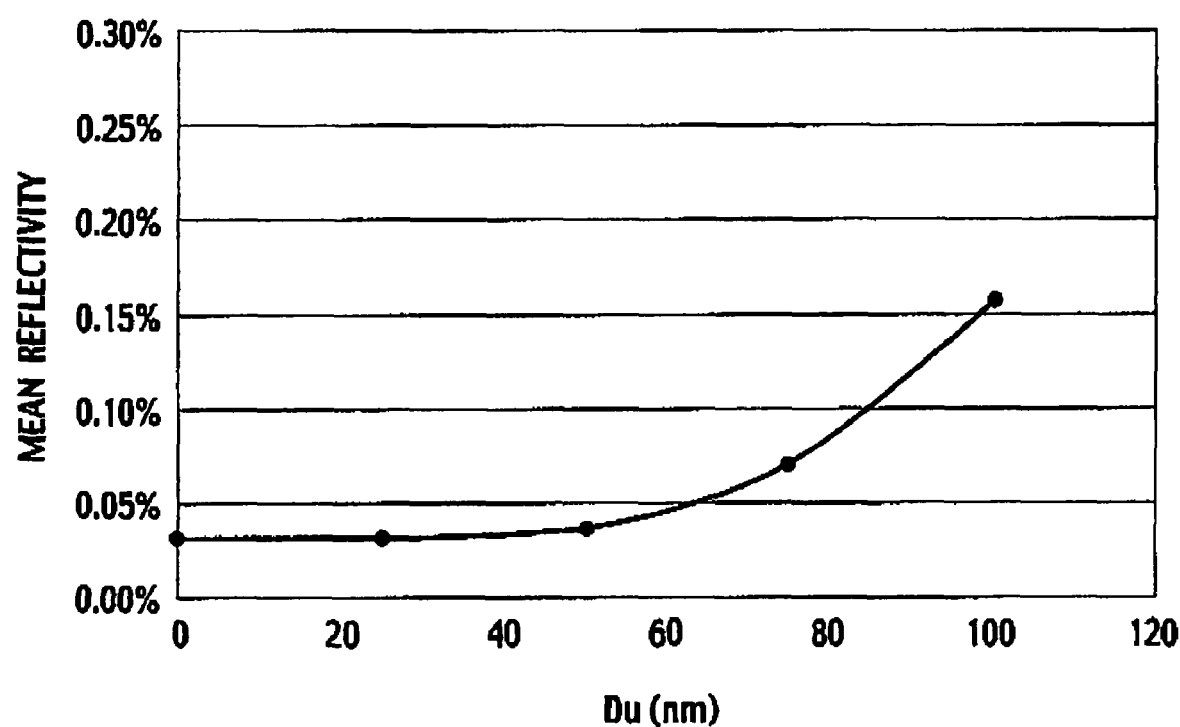
FIG. 3 shows a graph of an upper diameter Du of the fine convex part of the anti-reflection fine structure, relative to mean reflection ratio.

FIG. 3 is a graph showing the upper diameter Du of the upper face 3 of each of the fine convex parts 1p of the anti-reflection fine structure 1, relative to a mean reflection ratio. The more the upper diameter Du is, the more the flat face ratio is increased, resulting in higher reflection ratio. As obvious from FIG. 3, however, the upper diameter Du of more than or equal to 50 nm starts rapidly increasing the reflection ratio. In the range less than 50 nm, however, the graph is substantially similar to a non-flattening case (Du=0). With this, the upper diameter Du of the upper face 3 of the fine convex part 1p is to be set less than 50 nm.

In the above anti-reflection fine structure 1, however, even an electron beam lithography and the like finds an extreme difficulty in molding the upper diameter Du to less than or equal to 5 nm, which is a lower limit.

Figure 4A:
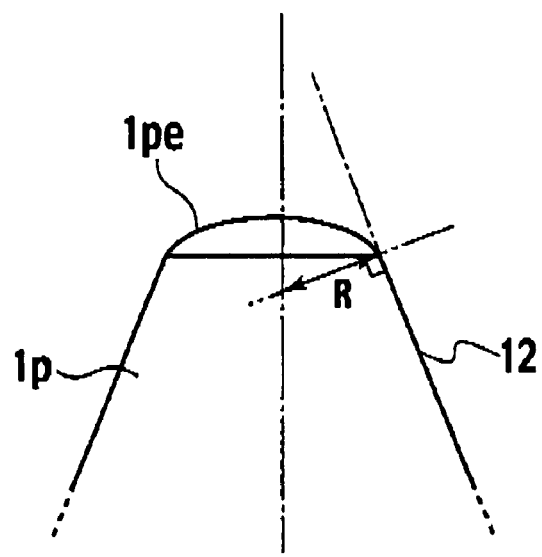
FIG. 4A, FIG. 4B and FIG. 4C show different schematic configurations of a bead end face of the fine convex part of the anti-reflection fine structure.

Moreover, for further decreasing the reflection ratio, the upper face 3 (head end face 1pe) of the above fine convex part 1p is preferred to be a curved face such as a dome in FIG. 4A, rather than the flat face. A curvature radius R of the above curved face is preferred to meet the following expression [X], where H denotes height of the fine convex part 1p.

$$R \geq [\{(Du^2 - Du \cdot Db)/(4 \cdot H)\}^2 + (Du/2)^2]^{1/2} \quad [X]$$

That is, the right hand of the above expression [X] denotes a length of a vertical line from a normal line (passing through a center point of a circumscribing circle of the base face 2) downward to a ridge line 12 at a head end of the anti-reflection fine structure 1, in other words, the length of the vertical line denotes the curvature radius of the head end face 1pe. The curvature radius R of the head end face 1pe of the fine convex part 1p less than or equal to the thus calculated value sharpens the head end, causing, as the case may be, scratches attributable books.

Figure 4B:
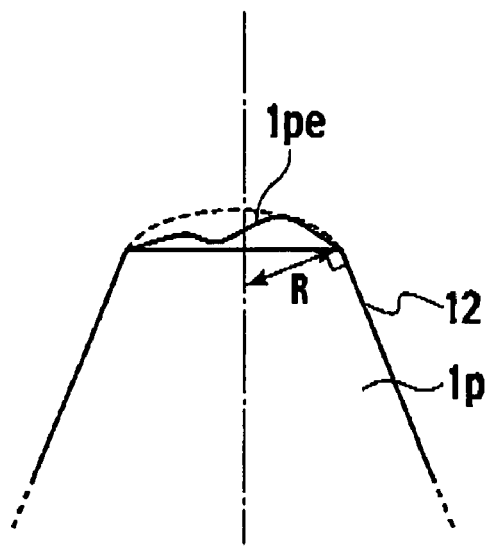
Figure 4C:
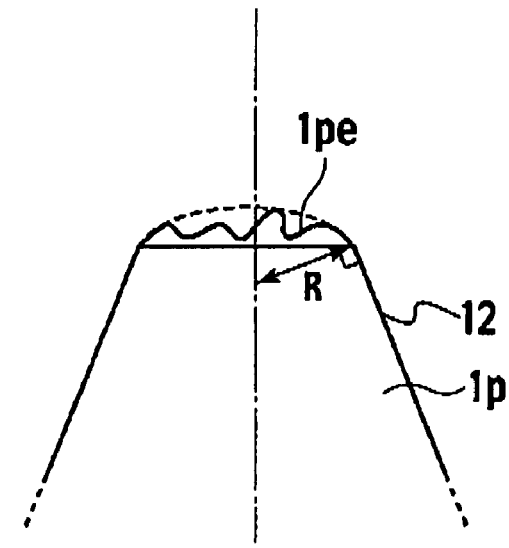

Herein, the configuration of the bead end face 1pe of the fine convex part 1p may be variable (amorphous) as shown in FIG. 4B and FIG. 4C, provided that the bead end face 1pe be received (included) in the domed curved face having the above curvature radius R.

The configuration of the fine convex part 1p of the present invention, as set forth above, is the truncated cone or the truncated pyramid. In this case, however, the configuration is not necessarily limited to an accurate truncated cone or an accurate truncated pyramid, that is, a generating line of the truncated cone or a ridge line 12 of the truncated pyramid is not limited to be straight, but can be curved. The generating line or the ridge line 12 is preferred to be curved, meeting the following n-order linear expressions [1] and [2]. With this, the change in the refractive index in the thickness direction of the anti-reflection fine structure 1 becomes more gentle, thereby more effectively decreasing the light reflection ratio. Herein, the n-order of the linear expressions [1] and [2] is preferred to be in the range of more than 1 to less than or equal to 3.

Figure 5A:
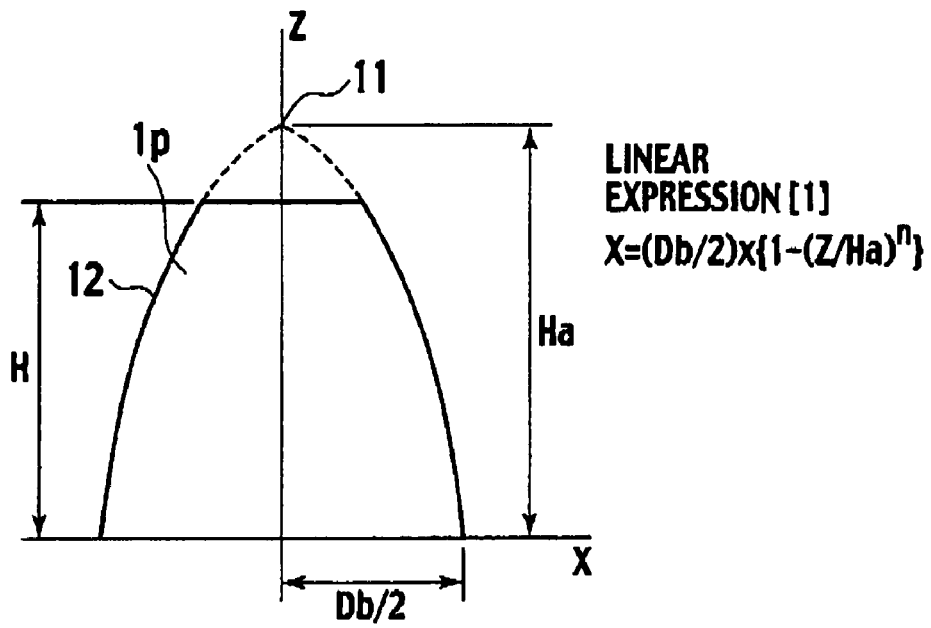
FIG. 5A and FIG. 5B show that the configurations of a ridge line of the fine convex part of the anti-reflection fine structure are expressed by the respective n-order linear expressions [1] and [2], under the present invention.
Figure 5B:
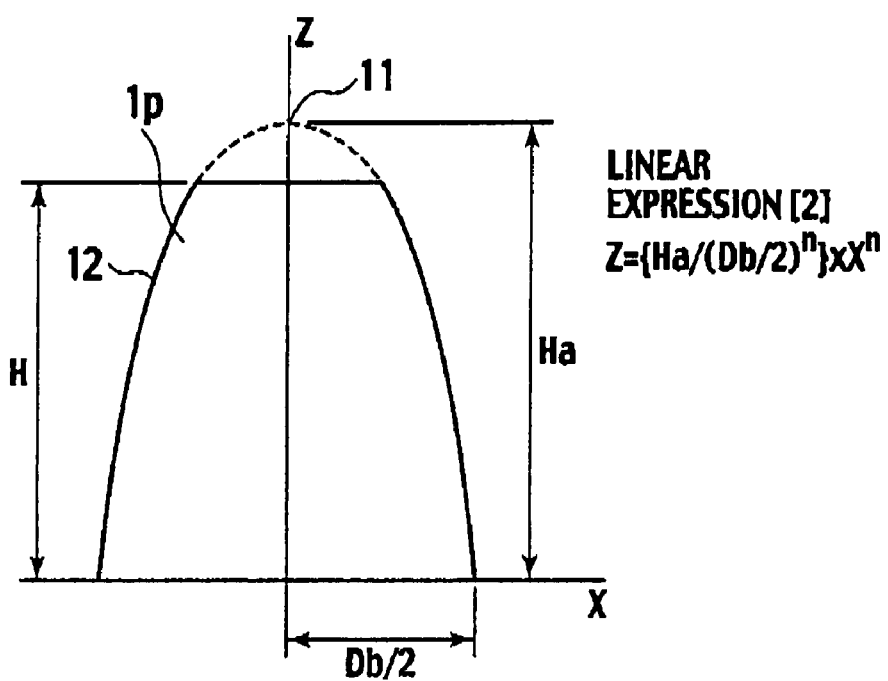

The above is to be more specifically set fort referring to FIG. 5A or FIG. 5B. With a base side defined as an X axis and an apex 11 disposed on a Z axis in a vertical cross section passing through a center of the fine convex part 1p, i) the height H of each of the fine convex parts 1p of the anti-reflection fine structure 1, ii) a height Ha up to the apex 11 which height is defined by an extension of the ridge line 12 of the fine convex part 1p, and iii) the base diameter Db of the base circle 2bc of the base face 2 or the base diameter Db of the base circle 2bc circumscribing about the base polygon 2bp of the base face 2, in combination, bring about an X coordinate on the ridge line 12 given by one of the following n-order linear expressions [1] and [2]:

$$X = (Db/2) \times \{1 - (Z/Ha)^n\} \quad [1] \text{ see FIG. 5A}$$

$$Z = \{Ha/(Db/2)^n\} \times X^n \quad [2] \text{ see FIG. 5B}$$

Hereinabove, when the apex 11 is disposed in a certain position, a constant term can be added for correction.

Moreover, the configuration of the base face 2 of the fine convex part 1p is preferred to be such that the base faces 2 of the adjacent fine convex parts 1p be in contact with each other not being spaced apart, from the view point of further decreasing the reflection ratio by decreasing the flat face part between the fine convex parts 1p.

From the above view point i) orientation-less circles, ii) equilateral triangles, iii) squares and iv) equilateral hexagons which can be lined on a flat face without a space are preferable.

Molding the above anti-reflection fine structure 1 of the present invention on a substrate 15, typically on a fit face 15A of a transparent substrate 15 or preferably on both faces (the first face 15A and a second face 15B) thereof can form the anti-reflection mold body 10. Applying the above anti-reflection mold body 10 to panels of various display devices, a transparent panel of a show window or show case and the like can decrease reflections of an outside light or of an in-house illumination, effectively preventing imaging-in of reflection image, thus improving visibility of image, display and inner show piece.

Moreover, applying the above anti-reflection fine structure 1 (the anti-reflection mold body 10) to various parts such as those of automobile, specifically, glass of window or roof, meter front cover, bead lamp, rear finisher, film for frontmost face of a display device such as that using liquid crystal and the like, and the like can bring about the like anti-reflection effect.

Methods of producing the anti-reflection mold body 10 is to be set forth, under the present invention. A forming die having the above myriad of fine convex parts 1p is prepared Then, the forming die and the substrate 15 are relatively pressed in such a state that at least one of the forming die and the substrate 15 is heated. Thereby, the anti-reflection fine structure 1 is formed on at least one of the fit face 15A and second face 15B of the substrate 15.

Alternatively, an active energy line is irradiated to the forming die and the substrate 15 with an active energy line setting resin intervened therebetween, followed by setting (curing) of the active energy line setting resin, to thereby form the anti-reflection fine structure 1 on at least one of the first face 15A and second face 15B of the substrate 15, thus forming the anti-reflection mold body 10.

Preferably, typical materials for the above substrate 15 are those having transparency, specifically, i) thermoplastic resins such as polymethyl methacrylate, polymethyl acrylate, polyethylene, polypropylene, polyvinyl alcohol, polyvinylidene chloride, polyethylene terephthalate, polyvinyl chloride, polystyrene, ABS resin, AS resin, acrylic resin, polyamide, polyacetal, polybuthylene terephthalate, glass-reinforced polyethylene terephthalate, polycarbonate, modified polyphenylene ether, polyphenylene sulfide, polyetherether ketone, liquid crystalline polymer, fluorine resin, polyallate, polysulfone, polyethersulfone, polyamnideimide, polyetherimide, thermoplastic polyimide and the like, ii) thermo-setting resins such as phenol resin, melamine resin, urea resin, epoxy resin, unsaturated polyester resin, alkyd resin silicone resin, diallyl phthalate resin, polyamide bismaleimide, polybisamide tiazole and the like, and iii) a combination of two or more of the above.

Moreover, examples of the active energy line setting resin which initiates polymerization by an irradiating such as ultraviolet ray and the like and then sets (cures) include i) ultraviolet ray setting acryl urethane resin ultraviolet ray setting polymethyl methacrylate, ultraviolet ray setting polymethyl acrylate, ultraviolet ray setting polymethacrylate resin, ultraviolet may setting ethoxyacrylate resin, ultraviolet ray setting polyol acrylate resin, ultraviolet ray setting epoxy resin and the like. Polymerization initiator causing radicals by irradiating the active energy line can be used when necessary. Moreover, a setting agent (curing agent, hardening agent) such as isocyanate can be added for further strengthening the setting. Typical examples of the active energy line used herein include ultraviolet ray, X ray, other electron beams, other electromagnetic wave and the like, but not specifically limited thereto.

Moreover, an inorganic transparent material such as glass can be used for the substrate 15. In his case, the anti-reflection fine structure 1 can be formed on at least one of the first face 15A and second fate 15B of the substrate 15 through methods such as i) cutting a surface of the glass by an electron beam and the like, and ii) pouring the fused inorganic transparent material into a mold having the anti-reflection fine structure 1 under the present invention.

In the latter method hereinabove, after pouring the fused inorganic transparent material, when necessary, a second mold having a like anti-reflection structure is to be pressed before the above material is cooled, to thereby form the anti-reflection fine structure 1 on the first and second faces 15A, 15B of the substrate 15. Otherwise, when necessary, the inorganic transparent material with both faces thereof pressed by molds is heated up to a softening point and then is pressed for transfer-printing the configuration, to thereby form the anti-reflection fine structure 1 on the first and second faces 15A, 15B of the substrate 15.

EXAMPLES

Hereinafter, the present invention is to be more specifically set forth based on the following examples. The present invention is, however, not limited to the examples.

First Example

A die developed by a commercially-available electron beam drawing device was heated up to 150° C. Then, the die was pressed at a pressure of 10 MPa to both faces (first face 15A and second face 15B) of polymethyl methacrylate substrate 15 for 1 hour, followed by cooling to less than or equal to 70° C., to thereby form the anti-reflection mold body 10 having both faces (first face 15A and second face 15B) each provided with the anti-reflection fine sure 1 where the fine convex parts 1p are arranged in a hexagonal closed packed structure (pitch 4: 200 nm). Each of the fine convex parts 1p is formed into a truncated cone having the base face 2 with the base diameter Db of 200 nm, the upper face 3 with the upper diameter Du of 20 nm the height H of 400 nm, and the curvature radius R (at the head end face 1pe) of 10.25 nm.

Second Example

Operations like those according to the above first example were implemented using a die developed by a like electron beam drawing device, to thereby form the anti-reflection mold body 10 including the polymethyl methacrylate substrate having both faces (first face 15A and second face 15B) each provided with the anti-reflection fine structure 1 where the fine convex parts 1p are arranged in the hexagonal closest packed state (pitch 4: 250 nm). Each of the fine convex parts 1p is formed into the truncated cone having the base face 2 with the base diameter Db of 250 nm, the upper face 3 with the upper diameter Du of 25 nm, the height H of 250 nm, and the head end face 1pe being flat.

Third Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 250 nm). Each of the fine convex parts 1p is formed into the truncated cone having the base face 2 with the base diameter Db of 250 nm, the upper face 3 with the upper diameter Du of 25 nm, the height H of 250 nm, and the curvature radius R (at the head end face 1pe) of 13.71 nm.

Fourth Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 177 nm). Each of the fine convex pats 1p is formed into a square truncated pyramid having the base face 2 with the base diameter Db (of a circle circumscribing about a square) of 250 nm, the upper face 3 with the upper diameter Du (of a circle circumscribing about a square) of 50 nm, the height H of 500 nm, and the curvature radius R (at the head end face 1pe) of 25.50 nm.

Fifth Example

Operations like those according to the above first example were implemented using the die developed by the like electron beam drawing device, to thereby form the anti-reflection mold body 10 including the polymethyl methacrylate substrate 15 having a backface (second face 15B) provided with the anti-reflection fine structure 1 where the fine convex parts 1p are arranged in the hexagonal closest packed state (pitch 4: 300 nm). Each of the fine convex parts 1p is formed into the truncated cone having the base face 2 with the base diameter Db of 300 nm, the upper face 3 with the upper diameter Du of 50 nm, the height H of 600 nm, and the curvature radius R (at the head end face 1pe) of 25.54 nm.

Sixth Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 177 nm). Each of the fine convex parts 1p is formed into the square truncated pyramid having the base face 2 with the base diameter Db (of the circle circumscribing about the square) of 250 nm, the upper face 3 with the upper diameter Du (of the circle circumscribing about the square) of 30 nm, a height Ha (up to the apex 11) of 640 nm, the height H of 550 nm, and the head end face 1pe being flat. In each of the fine convex parts 1p, the ridge line 12 extending from an outer peripheral part of the head end face 1pe to an outer peripheral part of the base face 2 is given by the following linear expression [1] having an order n=1.2.

$$X = (Db/2) \times \{1 - (Z/Ha)^n\} \quad [1]$$

Seventh Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 177 nm). Each of the fine convex parts 1p is formed into the square truncated pyramid having the base face 2 with the base diameter Db (of the circle circumscribing about the square) of 250 nm, the upper face 3 with the upper diameter Du (of the circle circumscribing about the square) of 50 nm, the height Ha (up to the apex 11) of 720 nm, the height H of 550 nm, and the curvature radius R (at the head end face 1pe) of 50 nm. In each of the fine convex parts 1p, the ridge line 12 extending from the outer peripheral part of the head end face 1pe to the outer peripheral part of the base face 2 is given by the linear expression [1] having the order n=12.

Eighth Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 212 nm). Each of the fine convex parts 1p is formed into the square truncated pyramid having the base face 2 with the base diameter Db (of the circle circumscribing about the square) of 300 nm, the upper face 3 with the upper diameter Du (of the circle circumscribing about the square) of 40 nm, the height Ha (up to the apex 11) of 400 nm, the height H of 300 nm, and the curvature radius R (at the head end face 1pe) of 45 nm. In each of the fine convex parts 1p, the ridge line 12 extending from the outer peripheral part of the head end face 1pe to the outer peripheral part of the base face 2 is given by the following linear expression [2] having an order n=2.

$$Z = \{Ha/(Db/2)^n\} \times X^n \quad [2]$$

Ninth Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 141 nm). Each of the fine convex parts 1p is formed into the square truncated pyramid having the base face 2 with the base diameter Db (of the circle circumscribing about the square) of 200 nm, the upper face 3 with the upper diameter Du (of the circle circumscribing about the square) of 10 nm, the height Ha (up to the apex 11) of 555 nm, the height H of 500 nm, and the curvature radius R (at the head end face 1pe) of 15 nm. In each of the fine convex parts 1p, the ridge line 12 extending from the outer peripheral part of the head end face 1pe to the outer peripheral part of the base face 2 is given by the linear expression [2] having the order n=2.

First Comparative Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 250 nm). Each of the fine convex parts 1p is formed into a cone having the base face 2 with the base diameter Db of 250 nm and the height H of 750 nm.

Second Comparative Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 400 nm). Each of the fine convex parts 1p is formed into the truncated cone having the base face 2 with the base diameter Db of 400 nm, the upper face 3 with the upper diameter Du of 25 nm, the height H of 800 nm, and the curvature radius R (at the head end face 1pe) of 12.84 nm.

Third Comparative Example

Operations like those according to the above first example were implemented using the die developed by the like electron beam drawing device, to thereby form the anti-reflection mold body 10 including the polymethyl methacrylate substrate 15 having both faces (first face 15A and second face 15B) each provided with the anti-reflection fine structure 1 where the fine convex parts 1p are arranged in the hexagonal closest packed state (pitch 4: 250 nm). Each of the fine convex parts 1p is formed into the truncated cone having the base face 2 with the base diameter Db of 250 nm, the upper face 3 with the upper diameter Du of 100 nm, the height H of 500 nm, and the curvature radius R (at the head end face 1pe) of 50.56 nm.

[Evaluation Test Method]

The above anti-reflection mold bodies 10 obtained through the above examples and comparative examples were subjected to the following evaluation tests on mean reflection ratio and scratch proof. Table 1 shows evaluation test results as well as specifications of each of the anti-reflection mold bodies 10.

(1) Mean Reflection Ratio Measurement

A variable angle spectrometer (made by Otsuka Electronics Co., Ltd.) was used for measuring the reflection ratio of each of the anti-reflection mold bodies 10 at light incidence angle of 0 and measurement angle of 0. The measurements were implemented at stepwise wave lengths (10 nm) from 380 nm to 790 nm. The mean value of the measurements was defined as mean reflection ratio.

(2) Scratch Proof Test

Based on the pencil hardness test specified in JIS K5600-5-4 (where JIS stands for Japan Industrial Standard), an HB pencil was used for scratching the test samples at a load of 1 kg. Through a visual check, thereafter, the samples determined to have scratches were evaluated as "Unacceptable" while those determined not to have scratches were evaluated as "Acceptable."

In addition to the specifications for the anti-reflection fine structure 1, table 1 shows evaluation test results including the mean reflection ratios and scratch proof.

On the contrary, the anti-reflection mold body 10 provided with the anti-reflection fine structure 1 having the fine convex part 1p formed into a cone (instead of the truncated cone) according to the first comparative example is excellent in anti-reflectivity but is likely to cause scratches, therefore is not practical (unacceptable).

Moreover, the anti-reflection mold body 10 according to the second comparative example, though having the fine convex part 1p formed into the truncated cone while having the base face 2 (base diameter Db) so large as to cause the pitch 4 (=400 nm) larger than the shortest wave length of visible light ray, is excellent in scratch proof but deteriorated in anti-reflectivity.

Furthermore, the anti-reflection mold body 10 according to the third comparative example, though having the fine convex part 1p formed into Me truncated cone while having the extremely large upper face 3 (upper diameter Du), is excellent in scratch proof but deteriorated in anti-reflectivity.

Although the present invention has been set forth above by reference to a certain embodiment, the present invention is not limited to the embodiment described above. Modifications and variations of the embodiment described above will occur to those skilled in the art, in light of the above teachings.

TABLE 1

| | | Fine convex part 1p | | | | Curvature radius R | | Evaluation test result | |
| --- | --- | --- | --- | --- | --- | --- | --- | --- | --- |
| Section | Configuration | Base diameter Db (nm) | Upper diameter Db (nm) | Height H (nm) of 1p | Configuration of ridge line 12 | (nm) at head end face Ipe | *C (mn) | Mean reflection ratio (%) | Scratch proof |
| First example | Truncated cone | 200 | 20 | 400 | Straight | 10.25 | 10.25 | 0.18 | Acceptable |
| Second example | Truncated cone | 250 | 25 | 750 | Straight | Infinite (flat) | 12.64 | 0.12 | Acceptable |
| Third example | Truncated cone | 250 | 25 | 250 | Straight | 13.71 | 13.71 | 0.32 | Acceptable |
| Fourth example | Truncated pyramid | 250 | 50 | 500 | Straight | 25.50 | 25.50 | 0.18 | Acceptable |
| Fifth example | Truncated cone | 300 | 50 | 600 | Straight | 25.54 | 25.54 | 0.38 | Acceptable |
| Sixth example | Truncated pyramid | 250 | 30 | 550 | Linear expression [1], n = 1.2 | Infinite (flat) | 15.30 | 0.10 | Acceptable |
| Seventh example | Truncated pyramid | 250 | 50 | 550 | Linear expression [1], n = 1.2 | 50 | 25.41 | 0.07 | Acceptable |
| Eighth example | Truncated pyramid | 300 | 40 | 300 | Linear expression [2], n = 2 | 45 | 21.80 | 0.53 | Acceptable |
| Ninth example | Truncated pyramid | 200 | 10 | 500 | Linear expression [2], n = 2 | 15 | 5.09 | 0.08 | Acceptable |
| First comparative example | Cone | 250 | Not available | 750 | Straight | Not available | Not available | 0.08 | Unacceptable |
| Second comparative example | Truncated cone | 400 | 25 | 800 | Straight | 12.84 | 12.84 | 1.15 | Acceptable |
| Third comparative example | Truncated cone | 250 | 100 | 500 | Straight | 50.56 | 50.56 | 1.02 | Acceptable |

*C = $[(\{Du^2 - Du \cdot Db\}/(4H))^2 + (Du/2)^2]^{1/2}$
Relative visibility: less than or equal to 0.1%

As a result, the first example to the ninth example having such a structure that each of the fine convex parts 1p of the anti-reflection fine structure 1 is formed substantially into the truncated cone or the truncated pyramid, and the base diameter Db and the upper diameter Du are each within a certain range show i) the mean reflection ratios that are low at the visible light ray wave length and ii) the excellent scratch proof.

This application is based on prior Japanese Patent Applications No. P2006-054262 (filed on Mar. 1, 2006 in Japan) and No. P2006-293705 (filed on Oct. 30, 2006 in Japan). The entire contents of the Japanese Patent Applications No. P2006-054262 and No. P2006-293705 from which priorities are claimed are incorporated herein by reference, in order to take some protection against translation errors or omitted portions.

The scope of the present invention is defined with reference to the following claims.

What is claimed is:

1. An anti-reflection structure, comprising:
   a plurality of convex parts arranged at pitches, each of which is shorter than a wave length of a visible light ray, each of the convex parts being formed into one of a substantially truncated cone and a substantially truncated pyramid, each including:
   a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm wherein each of the convex parts has a head end face which is so curved as to define a curvature radius R meeting the following expression:

$R \geq [\{(Du^2 - Du \cdot Db)/(4 \cdot H)\}^2 + (Du/2)^2]^{1/2}$ where H denotes a height of the each of the convex parts.

2. The anti-reflection structure as claimed in claim 1, wherein the base faces of the convex parts adjacent to each other are in contact with each other.

3. The anti-reflection structure as claimed in claim 2, wherein each of the base faces is formed into any of the following:
   an orientation-less circle,
   an equilateral triangle,
   a square, and
   an equilateral hexagon.

4. An anti-reflection mold body, on at least one of a first face and a second face thereof, comprising,
   the anti-reflection structure according to claim 1.

5. The anti-reflection mold body as claimed in claim 4, wherein the anti-reflection mold body is substantially transparent.

6. An automobile part, comprising:
   the anti-reflection structure according to claim 1.

7. An anti-reflection structure, comprising:
   a plurality of convex parts arranged at pitches, each of which is shorter than a wave length of a visible light ray, each of the convex parts being formed into one of a substantially truncated cone and a substantially truncated pyramid, each including:
   a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm wherein:
   with a base side defined as an X axis and an apex disposed on a Z axis in a vertical cross section passing through a center of each of the convex parts,
   a height H of each of the convex parts of the anti-reflection structure,
   a height Ha up to the apex which height is defined by an extension of a ridge line of the each of the convex parts, and
   the base diameter Db of the base circle of the base face or the base diameter Db of the base circle circumscribing about the base polygon of the base face,
   in combination, bring about an X coordinate on the ridge line given by one of the following n-order linear expressions [1] and [2]:

$X = (Db/2) \times \{1 - (Z/Ha)^n\}$ [1]

$Z = \{Ha/(Db/2)^n\} X^n$ [2].

8. An anti-reflection mold body, on at least one of a first face and a second face thereof, comprising: the anti-reflection structure according to claim 7.

9. An automobile part, comprising: the anti-reflection structure according to claim 7.

10. A method of producing an anti-reflection mold body, comprising:
    preparing:
    a forming die having an anti-reflection structure including:
    a plurality of convex parts arranged at pitches, each of which is shorter than a wave length of a visible light ray, each of the convex parts being formed into one of a substantially truncated cone and a substantially truncated pyramid, each including:
    a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm, wherein each of the convex parts has a head end face which is so curved as to define a curvature radius R meeting the following expression:

$R \geq [\{(Du^2 - Du \cdot Db)/(4 \cdot H)\}^2 + (Du/2)^2]^{1/2}$ where H denotes a height of the each of the convex parts, and
    a substrate for the anti-reflection mold body;
    pressing the forming die and the substrate relative to each other in such a state that at least one of the forming die and the substrate is heated; and
    forming the anti-reflection structure on at least one of a first face and a second face of the substrate.

11. A method of producing an anti-reflection mold body, comprising:
    preparing:
    a forming die having an anti-reflection structure including:
    a plurality of convex parts arranged at pitches, each of which is shorter than a wave length of a visible light ray, each of the convex parts being formed into one of a substantially truncated cone and a substantially truncated pyramid, each including:

a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm, wherein each of the convex parts has a head end face which is so curved as to define a curvature radius R meeting the following expression:

$R \geq [\{(Du^2 - Du \cdot Db)/(4 \cdot H)\}^2 + (Du/2)^2]^{1/2}$ where H denotes a height of the each of the convex parts, and a substrate for the anti-reflection mold body;

irradiating an active energy to the forming die and the substrate with an active energy line setting resin intervened between the forming die and the substrate; and forming the anti-reflection structure on at least one of a first face and a second face of the substrate.

12. A method of producing an anti-reflection mold body, comprising:

preparing:

a forming die having an anti-reflection structure including:

a plurality of convex parts arranged at pitches, each of which is shorter than a wave length of a visible light ray, each of the convex parts being formed into one of a substantially truncated cone and a substantially truncated pyramid, each including:

a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm, wherein:

with a base side defined as an X axis and an apex disposed on a Z axis in a vertical cross section passing through a center of each of the convex parts, a height H of each of the convex parts of the anti-reflection structure, a height Ha up to the apex which height is defined by an extension of a ridge line of the each of the convex parts, and the base diameter Db of the base circle of the base face or the base diameter Db of the base circle circumscribing about the base polygon of the base face, in combination, bring about an X coordinate on the ridge line given by one of the following n-order linear expressions [1] and [2]:

$X = (Db/2) \times \{1 - (Z/Ha)^n\}$ [1]

$Z = \{Ha/(Db/2)^n\} X^n$ [2], and a substrate for the anti-reflection mold body;

pressing the forming die and the substrate relative to each other in such a state that at least one of the forming die and the substrate is heated; and forming the anti-reflection structure on at least one of a first face and a second face of the substrate.

13. A method of producing an anti-reflection mold body, comprising:

preparing:

a forming die having an anti-reflection structure including:

a plurality of convex parts arranged at pitches, each of which is shorter than a wave length of a visible light ray, each of the convex parts being formed into one of a substantially truncated cone and a substantially truncated pyramid, each including:

a base face formed into one of a base circle and a base polygon inscribed in the base circle, the base circle and the base circle circumscribing about the base polygon each having a base diameter Db meeting the following expression:

100 nm<Db<380 nm, an upper face formed into one of an upper circle and an upper polygon inscribed in the upper circle, the upper circle and the upper circle circumscribing about the upper polygon each having an upper diameter Du meeting the following expression:

5 nm<Du<50 nm, wherein:

with a base side defined as an X axis and an apex disposed on a Z axis in a vertical cross section passing through a center of each of the convex parts, a height H of each of the convex parts of the anti-reflection structure, a height Ha up to the apex which height is defined by an extension of a ridge line of the each of the convex parts, and the base diameter Db of the base circle of the base face or the base diameter Db of the base circle circumscribing about the base polygon of the base face, in combination, bring about an X coordinate on the ridge line given by one of the following n-order linear expressions [1] and [2]:

$X = (Db/2) \times \{1 - (Z/Ha)^n\}$ [1]

$Z = \{Ha/(Db/2)^n\} X^n$ [2], and a substrate for the anti-reflection mold body;

irradiating an active energy to the forming die and the substrate with an active energy line setting resin intervened between the forming die and the substrate; and forming the anti-reflection structure on at least one of a first face and a second face of the substrate.

* * * * *